3,275,698
DEHYDRATION OF ALCOHOLS
Clyde E. Parish, Houston, Tex., assignor to Signal Oil and
Gas Company, Los Angeles, Calif.
No Drawing. Filed Jan. 21, 1963, Ser. No. 252,564
11 Claims. (Cl. 260—666)

The present invention generally relates to dehydration of alcohols and more particularly relates to the dehydration of paraffinic and cycloparaffinic alcohols, preferably of the secondary and tertiary types rather than primary type, to the corresponding olefins by an improved method utilizing an improved catalyst.

Olefinic and cycloolefinic hydrocarbons have been prepared by a number of different methods, including the dehydration of paraffinic and cycloparaffinic alcohols. In the conversion of such an alcohol into the corresponding unsaturated hydrocarbon, simultaneous elimination from the alcohol of the hydroxyl group and a hydrogen atom from a carbon atom adjacent to that which carries the hydroxyl group occurs, with water as a by-product. For example, ethyl alcohol can be dehydrated to ethylene by loss of the hydroxyl group and a hydrogen atom from the adjacent carbon atom.

Various methods have been utilized to bring about dehydration of such alcohols to the corresponding unsaturated hydrocarbons. In this regard, alcohol dehydration can be effected, for example, by passing vaporized alcohol through a tube packed wtih coarse granules of alumina and maintained at a temperature of 350–300° C. in an electrically heated furnace. The reaction resembles pyrolysis of an alkane, since it involves production of an unsaturated product from a saturated one at an elevated temperature. Cyclohexanol, for example, can be dehydrated to the cycloolefin cyclohexene over alumina at about 330° C. to 350° C., with product yields of up to about 80 percent. However, at such elevated temperature, there is a strong likelihood of producing substantial polymerization of the cyclohexanol and thus reducing the yield of cyclohexene. Moreover, other side reactions and by-products have a tendency to substantially increase at such elevated reaction temperatures. Accordingly, a nearly quantitative yield of cyclohexene cannot be obtained from the cyclohexanol utilizing a relatively high reaction temperature and a suitable refractory material, such as alumina, as a catalyst.

Alcohols can also be dehydrated at lower temperatures by chemical dehydrating agents, for example, sulfuric acid. Thus, ethylene can be produced from a mixture of ethyl alcohol and sulfuric acid which is heated only to about 170° C. However, with such reactions the yield of product usually is not very high due to substantial by-product formation. Dehydration of alcohol can also be carried out utilizing phosphorous pentoxide ($P_2O_5$) or other strong acids, particularly mineral acids, instead of sulfuric acid. For example, hydrochloric acid has been used with some success. However, alcohol dehydration utilizing such reagents is subject to the same difficulties as encountered with sulfuric acid, in that a relatively high degree of polymeric formation of the reactants occurs, with a consequent substantial decrease of product yield to well below nearly quantitative levels.

In order to overcome difficulties encountered with the use of strong mineral acids as catalysts in the dehydration of alcohols, recently more complicated catalyst systems have been employed, for example, phenol-sulfonate systems and the like. Although such systems have generally resulted in a reduction in side reactions, particularly polymerization, during the alcohol dehydration reaction, they require relatively high operating temperatures and still do not result in essentially quantitative yields of product.

It has also been found that generally speaking, secondary and tertiary paraffinic and cycloparaffinic alcohols are easier to dehydrate than primary alcohols to corresponding unsaturated hydrocarbons. However, even in the case of tertiary and secondary alcohols, the yield of product is not nearly quantitative, regardless of the conventional dehydration method employed. Thus cyclohexanol can be dehydrated to cyclohexene in the presence of 95 percent sulfuric acid and at 130–140° C. However, a substantial concentration of polymers forms so that the yield of cyclohexene is usually well below 80 percent. Other acid type catalysts can be employed with similar results. The same is true when potassium bisulfate, phosphoric acid, iodine and oxalic acid are employed during the dehydration.

Accordingly, it would be desirable to provide a relatively simple, inexpensive alcohol dehydration method which would result in improved yields of the corresponding olefin or cycloolefin. It would be further desirable if such method conserved the catalyst over long periods of time.

Accordingly it is a primary object of the present invention to provide an improved method of dehydrating alcohols.

It is a further object of the present invention to provide a method of dehydrating alcohols to obtain high yields of corresponding unsaturated hydrocarbons.

It is a still further object of the present invention to provide an improved method of dehydrating paraffinic and cycloparaffinic alcohols to the corresponding olefinic or cycloolefinic hydrocarbons.

It is also an object of the present invention to provide an improved method of dehydrating paraffinic and cycloparaffinic alcohols, primarily of the secondary and tertiary types, which method employs a catalyst which improves the yield of product and which allows the method to be efficiently operated at a relatively low reaction temperature.

It is another object of the present invention to provide an improved catalyst for dehydration of paraffinic and cycloparaffinic alcohols and an improved inexpensive and simple method of utilizing the same to provide corresponding unsaturated hydrocarbon products in essentially quantitative yield.

It is a still further object of the present invention to provide a method of dehydrating secondary and tertiary paraffinic and cycloparaffinic alcohols wherein the catalyst for the method is substantially preserved over a long period of use without substantial gumming, clogging or promotion of polymeric formation of the reactants.

The foregoing and other objects are accomplished, in accordance with the present invention, by providing an improved method of dehydrating paraffinic and cycloparaffinic alcohols, principally of secondary and tertiary types, to the corresponding unsaturated hydrocarbons utilizing an improved catalyst comprising a mixture of a major proportion of a selected polyglycol ether and a minor portion of a selected strong mineral acid. It is believed although the invention is not limited thereto, that both the mineral acid and polyglycol ether catalyze the desired dehydration and enter into chemical reaction during the dehydration procedure.

As an example, in one embodiment of the present method sulfuric acid is utilized in a 5 weight percent concentration, based upon the polyglycol ether present, together with tetraethylene glycol. The sulfuric acid-tetraethylene glycol mixture is maintained in a reaction zone to which is continuously fed cyclohexanol for dehydration to cyclohexane. The temperature of the reaction zone is maintained at, for example, 280° F. and the product, cyclohexene, is vaporized from the reaction zone and recovered in essentially quantitative yield.

Accordingly, the method of the present invention is characterized by the use of an improved catalyst mixture, by the use of relatively low reaction temperatures and by the essentially quantitative yields of product. Moreover, the method is simple, inexpensive and adapted to batch and continuous operation. The catalyst mixture is substantially preserved over considerable periods of time in use. Polymerization and other undesired side reactions are minimized.

Now referring more particularly to the method of the present invention, alcohol selected from the group consisting of paraffinic alcohol, cycloparaffinic alcohol, and mixtures thereof is dehydrated. Preferably the alcohol is of the secondary or tertiary type. It is dehydrated to the corresponding unsaturated hydrocarbon, i.e. olefin or cycloolefin. Primary paraffinic and cycloparaffinic alcohols can be dehydrated by the present method, but reaction rates are relatively slow and, accordingly, such alcohols are not preferred reactants. Primary alcohols are those which have two hydrogen atoms directly attached to the same carbon atom to which the hydroxyl group is attached. Secondary and tertiary alcohols are preferred for the purpose of the present invention. Secondary alcohol is alcohol which is paraffinic or cycloparaffinic and which has only one hydrocarbon atom attached directly to the carbon atom to which the hydroxyl group is attached. Tertiary alcohol treated by the present method is alcohol which has no hydrogen atom directly attached to the carbon atom to which the hydroxyl group is attached.

An example of a paraffinic secondary alcohol is 2-n-octanol, which has the formula $CH_3(CH_2)_5CHOHCH_3$. Another example is pentanol-2 which has the formula $CH_3CH_2CH_2CHOHCH_3$. The alcohol 2-ethyl hexanol can also be used.

An example of a cycloparaffinic secondary alcohol is cyclohexanol, which has the formula $C_6H_{11}OH$. Another suitable secondary cycloparaffinic alcohol is 2-methyl cyclohexanol.

The alcohol 2-methyl butanol-2 which has the formula $CH_3CH_2CCH_3OHCH_3$ is an example of a paraffinic tertiary alcohol.

It will be further understood that dihydroxy paraffinic and cycloparaffinic alcohols can also be dehydrated in accordance with the present method. The initial dehydration of a dihydroxy alcohol in some cases results in a mono-hydroxy product. Further dehydration converts the mono-hydroxy product to a diolefin. As an example, the tertiary alcohol having the formula $$CH_3CH_3COHCH_2CHOHCH_3$$

has been dehydrated at a bottom pot (reaction vessel) temperature of 280° F. (overhead product 180–200° F.), utilizing as the catalyst tetraethylene glycol containing 5 wt. percent $H_2SO_4$, to a mixture containing the corresponding diene, the mono-hydroxy unsaturated alcohol and some unreacted dihydroxy alcohol. Other multi-hydroxy paraffinic and cycloparaffinic alcohols can also be dehydrated.

The catalyst for the present alcohol dehydration method comprises a minor portion of a selected mineral acid, such as hydrochloric acid or phosphoric acid, but preferably sulfuric acid, together with a major portion of a selected polyglycol ether. The mineral acid is selected with respect to the particular polyglycol ether to be employed and the particular alcohol to be dehydrated so as to obtain maximum effectiveness. The preferred mixture of catalysts is a mixture containing sulfuric acid and tetraethylene glycol. Other polyglycol ethers such as diethylene glycol, dipropylene glycol, triethylene glycol and the like can be used in the catalyst mixture. As previously indicated, the exact mechanism of reaction and cooperation of the two components of the catalyst mixture during the alcohol dehydration reaction is not known. However, the improved results obtained therewith are readily reproducible.

The acid of the catalyst is utilized in a minor concentration with respect to the polyglycol ether such that effective catalysis is provided at low temperature for essentially quantitative yield while polymerization and other undesirable side reactions are substantially eliminated.

In selecting the mineral acid to be used, not only must consideration be given to the particular polyglycol ether which is to be employed, but also to the possible contamination of the product. Thus, the boiling point of the mineral acid and ease of separation of entrained acid from the product, etc. are to be considered. The polyglycol ether itself is selected to some extent on the basis of its stability and boiling point. Particularly, polyglycol ethers are selected so that at the reaction temperature very little of the polyglycol ether is passed from the reaction zone in vaporized product.

The desired concentration range of acid with respect to the polyglycol ether will vary, depending upon the particular acid and polygylcol ether and the particular alcohol being dehydrated. However, it has been found that, for example, a sulfuric acid concentration of approximately 5 weight percent, based on the poylgylcol ether, in a sulfuric acid-tetraethylene gylcol mixture (using 95 percent concentrated sulfuric acid) is usually most satisfactory in the dehydration of a cycloparaffinic alcohol such as cyclohexanol. It has been found that for the dehydration of cyclohexanol, concentrations of sulfuric acid over 5 weight percent are no more satisfactory than the 5 weight percent concentration of the sulfuric acid. In addition, concentrations of the sulfuric acid of over about 10 weight percent tend during dehydration of cyclohexanol to increase the degree of polymerization of reactants and to decrease the yield of cyclohexene, and, accordingly, are undesirable. In the dehydration of cyclohexanol concentrations of sulfuric acid of less than about 1 percent, by weight, usually fail to produce a sufficiently rapid reaction rate to render them practical. Moreover, a higher reaction temperature is required. However, if allowed to proceed, the reaction usually goes to completion and the ultimate yield of product is fairly high. Accordingly, for most practical purposes, in the dehydration of cycloparaffinic alcohols, and also paraffinic alcohols a concentration of sulfuric acid in the polyglycol ether of between about 1 and about 10 percent by weight, based on the ether, will be utilized, with a preferred concentration usually at about 5 weight percent for the sulfuric acid.

It will be understood that it is desired to maintain as low a reaction temperature as is consistent with a suitable rapid reaction rate in the dehydration method in order to conserve heat and minimize costs, and particularly in order to minimize danger of polymerization and other side reactions with loss of yield.

In accordance with the present method, liquid alcohol to be dehydrated is contacted in a reaction zone, for example, a glass-lined kettle or the like, with the catalyst mixture comprising the polyglycol ether and mineral acid dispersed therein. In the reaction zone, the alcohol should be kept substantially uniformly mixed with the catalyst mixture and the catalyst components with each other, preferably by agitation for full contacting of the reactants. The temperature in the reaction zone is increased to and maintained at a point which permits a suitable reaction rate and is above the boiling point of the product and below the boiling point of the charge alcohol. Moreover, the reaction temperature is sufficiently low to prevent substantial side reactions and loss of yield. The reaction temperature will vary, depending upon the particular alcohol being dehydrated and the particular catalyst mixture utilized. For example, a reaction temperature of between about 280 and 350° F. has been found to be suitable for conversion of cyclohexanol to cyclohexene. At any rate, it has been found that the desired reaction temperature is usually substantially lower than that utilized in conventional dehydration methods employing mineral acids. The dehydration reaction can be carried out at about atmospheric pressure, elevated pressures tending to suppress the reaction, and can be conducted on a continuous, batch or intermittent basis. It is preferred that the temperature in the reaction zone be maintained at a relatively constant level, and in a continuous method it is preferred that an alcohol charge which has been preheated to about reaction temperature be passed thereto in order not to cause substantial temperature fluctuations in the reaction zone. During the dehydration reaction, the product is passed from the reaction zone as gaseous effluent and can be recovered in suitable conventional condensation apparatus. In a continuous operation, minor additions of mineral acid can be made from time to time to the reaction zone to replace minimal losses therefrom.

It has been found that the dehydration reaction, in accordance with the present method, proceeds more rapidly than most conventional methods, even though a relatively low reaction temperature is used. Moreover, the product yield is nearly quantitative.

The following examples more particularly illustrate certain features of the present invention.

*Example I*

In order to test the effect of tetraethylene glycol as a catalyst in the dehydration of cyclohexanol to cyclohexene, 500 ml. of tetraethylene glycol were blended with 500 ml. of cyclohexanol. The pH of the blend was 5.5–6.5 and the blend was charged to an open top reaction vessel and heat was increased in the reaction vessel until boiling occurred. Initial boiling took place at an effluent temperature of 289° F. and at a temperature of 357° F. for the reaction vessel itself, i.e. the bottom of the mixture in the vessel. The effluent was recovered, condensed and examined for total yield and chemical nature. It was found that the yield of overhead product was approximately 99 percent but that no conversion of the cyclohexanol to cyclohexene had taken place. Accordingly, it was determined that acidic tetraethylene glycol could not catalyze the desired dehydration reaction.

In a second test, a blend of 400 ml. of catalyst mixture comprising tetraethylene glycol containing 5% by weight, based on the weight of the tetraethylene glycol, of concentrated 95% sulfuric acid, and 200 ml. of cyclohexanol was placed in a reaction vessel and mixed thoroughly. The blend was allowed to remain in the reaction vessel 15 minutes before heat was applied thereto. Heating of the blend in the reaction vessel was then carried out to a vessel temperature of about 273° F. Effluent was passed, recovered and condensed which had a boiling point of about 198° F. The vessel was continuously charged with new blend at the rate of about 100 ml. an hour until a total of 610 ml. of additional cyclohexanol had been introduced into the reaction vessel and reacted therein. It was noted that foaming occurred as the concentration of the total amount of blend within the reaction zone decreased. Accordingly, 100 p.p.m. (parts per million) of a conventional antifoam agent was added to the blend to correct this situation. The total charge of cyclohexanol reacted, was therefore 810 ml. Of that charge, the overhead product showed a yield of 663 ml. plus 133 ml. of water, for a 98.3% by volume yield. Sample analysis was made on the product and indicated a very high concentration of cyclohexene.

Upon fractionation of the product it was determined that the total yield of pure cyclohexene was over 95% by volume. Accordingly, the mixed catalyst comprising a polyglycol ether, particularly tetraethylene glycol, and a mineral acid, particularly 5 weight percent of 95% sulfuric acid, was highly effective in converting the cyclohexanol to cyclohexene.

*Example II*

Technical grade 2-methyl cyclohexanol was fractionated into three fractions, a first fraction having an initial boiling point of 320° F., a second fraction having a boiling point range of 329–332° F., and a residual fraction having a boiling point above 332° F. The 329–332° F. boiling point range fraction represented about 85.5 volume percent of the total 2-methyl cyclohexanol and was dehydrated to the corresponding 2-methyl cyclohexene by the following procedure.

A total of 100 ml. of the purified 2-methyl cyclohexanol and 400 ml. of tetraethylene glycol containing 5 weight percent, based on the tetraethylene glycol, 95% concentrated sulfuric acid, were added together, mixed well to form a blend and passed into a reaction vessel. The blend was then heated to a vessel temperature of 255° F., at which point additional amounts of the purified 2-methyl cyclohexanol were continuously added until a total amount of 800 ml. of the 2-methyl cyclohexanol had been reacted in the reaction vessel. The effluent was recovered and condensed during the dehydration reaction and was later analyzed. The charge rate for the 2-methyl cyclohexanol was about 420 ml. per hour and the take-off rate, that is, the effluent recovery rate was 400 ml. per hour.

It was noted that the initial boiling point thereof was 147° F. during the dehydration reaction but that the average boiling point of the condensed effluent was about 187° F. During the dehydration reaction, the vessel temperature gradually increased, with an average temperature of about 284° F. over the total treatment time.

A total of 770 ml. of product was recovered plus 130 ml. of water for a total yield of about 96.3 volume percent of product. Analysis of the product indicated an excellent yield of 2-methyl cyclohexene.

In a further test, dehydration of 2-ethyl hexanol to 2-ethyl hexene was carried out using 5 weight percent of 95% sulfuric acid in tetraethylene glycol as catalyst. The catalyst was blended in a concentration of about 400 ml. with 100 ml. of 2-ethyl hexanol, the blend then being placed in a reaction vessel and heated to a vessel temperature of about 320° F. The overhead product was recovered at the rate of above 300 ml. per hour and had a boiling range of 180° to 185° F. The reaction vessel temperature varied between 320° F. and 334° F. After about 100 ml. of the initial overhead product had been recovered, additional amounts of the 2-ethyl hexanol were charged to the reaction vessel until a total amount of 350 ml. of 2-ethyl hexanol had been treated therein. A total of 370 ml. of overhead product plus 155 ml. of water were obtained. The overhead product was found to be 2-ethyl hexene in substantially quantitative concentration.

Dehydration of iso-octanol, a commercial mixture of the secondary and tertiary alcohol isomers of normal primary octanol, was carried out. A blend of 110 ml. of iso-octanol and 400 ml. of tetraethylene glycol containing 5 weight percent of 95% sulfuric acid was charged to a reaction vessel and the vessel temperature was then brought to 313° F. An overhead product having a boiling point of 190° F. was initially recovered. A total of 200 ml. of iso-octanol was subsequently charged into the reaction vessel and reacted. A total of 370 ml. of overhead product was obtained which exhibited nearly quantitative conversion to the corresponding olefins.

*Example III*

The catalyst life for a tetraethylene glycol-sulfuric acid catalyst, containing about 5 weight percent of sulfuric acid, was tested by using the catalyst in a continuous dehydration of cyclohexanol to cyclohexene according to the procedure generally as set forth in Example I. A total of 500 ml. of tetraethylene glycol was used. The small addition (less than about 10 percent of the initial amount) of sulfuric acid was required during the dehydration to compensate for minimal losses. The indicated catalyst was used in the dehydration of 16,718 ml. of cyclohexanol, from which a total of 16,131 ml. of overhead product representing cyclohexene was recovered, along with a total of 2595 ml. of water. The yield of cyclohexene was found to be 91 volume percent. This test indicated that the desired dehydration could be effectively carried out utilizing the initially charged catalyst, upon addition thereto only of small quantities of 95% sulfuric acid, despite the large volume of cyclohexanol treated. Accordingly, a long catalyst life was demonstrated.

*Example IV*

Tests were run to determine the optimum sulfuric acid concentration in a catalyst comprising 95% sulfuric acid and tetraethylene glycol for use in the present dehydration method. Cyclohexanol was dehydrated according to the method of the second test of Example I, except for the substitution of about 1 weight percent of 95% sulfuric acid, based upon the tetraethylene glycol, instead of 5 weight percent of the sulfuric acid. A high yield of cyclohexene, approximately 90 percent yield was obtained but it was necessary to operate the reaction vessel at a temperature approximately 50° F. higher than that for the reaction set forth in the second test of Example I.

A second test was conducted utilizing 10 weight percent of 95% sulfuric acid, based on the tetraethylene glycol, instead of 1 weight percent sulfuric acid. It was found that a conversion of the cyclohexanol to cyclohexene was comparable to that of the 5 weight percent sulfuric acid treatment specified in the second test of Example I but that the overhead product was recovered at a much slower rate than when 5 weight percent sulfuric acid was used in the method specified in the second test of Example I.

*Example V*

An attempt was made to dehydrate cyclohexanol utilizing phenol and phosphoric acid. In this connection, 10.5 grams of phosphoric acid, 380 grams of phenol and 50 grams of cyclohexanol were placed in a reaction vessel and heated to 348° F., at which point additional cyclohexanol was introduced into the reaction zone at a charge rate of 97 grams per hour. Average vessel temperature was about 369° F. The yield of cyclohexene was essentially nil, even after a six hour period. Accordingly, it was shown that a mixture of phenol and phosphoric acid is not a suitable catalyst for the alcohol dehydration.

*Example VI*

A blend of 400 ml. of diethylene glycol, 22.12 grams of concentrated sulfuric acid (5% by wt. of diethylene glycol) and 200 ml. of cyclohexanol was charged to a reaction vessel. The charge was stirred for fifteen minutes, then heat was applied until distillation of the product occurred.

The initial boiling point of the overhead product was 164° F. Heating was continued and an additional 100 ml. of cyclohexanol was added to the reaction vessel at such a rate as to hold a constant volume in the reaction vessel.

Heating was continuted until the pot temperature reached 300° F. and the overhead temperature (temperature of the overhead product passing from the reaction vessel) was 212° F. A total of 323 ml. of product were taken overhead. It was found that 273 ml. of this overhead was an organic phase, while the balance was water.

The organic phase was separated, dried with anhydrous sodium sulfate and filtered. The volume of the dried organic phase was 242 ml. This material was fractionated into a 164–182° F. cut (174 ml.) and a 182° F. plus cut (62 ml.).

The Bromine Number of the 164–182° F. cut was 183.9, indicating about 96% pure cyclohexane. Gas chromatographic analysis indicated the presence of approximately 2% of material lighter than cyclohexene in that cut. The yield of cyclohexene was 91% of theoretical.

The foregoing examples clearly illustrate that the improved catalyst of the present invention is effective in providing a high yield of product at a relatively rapid rate and at relatively low reaction temperatures in the dehydration of non-aromatic alcohols. Such alcohols are alkanols and cycloalkanols, referred to herein as paraffinic and cycloparaffinic alcohols. Moreover, they are secondary and tertiary alcohols. The dehydration reaction results in the production of the corresponding olefins and cycloolefins. Both the mineral acid and the polyglycol ether have been found to be necessary in suitable relative concentrations to provide the desired catalytic effect. Neither polyglycol ether nor the mineral acid by itself is effective as a catalyst for such purposes. Moreover, neither the mineral acid nor the polyglycol ether can be replaced in the catalyst by other compounds, for example, phenol or the like, and provide comparable results.

As clearly illustrated in the accompanying examples, the alcohol dehydration method of the present invention provides a high yield of product at low reaction temperatures in a simple, rapid, effective manner utilizing a minimum amount of conventional equipment. The method is commercially suitable and the catalyst can be utilized over an extended period of time without substantial deterioration. Other advantages of the present invention are as set forth in the foregoing.

Although there have been disclosed and described above particular embodiments of the method of the present invention and the catalyst therefor by way of example, it will be appreciated that the invention is not limited thereto. Accordingly, any and all modifications, alterations and equivalent arangements with respect to the method of the present invention and the catalyst therefor which fall within the scope of the annexed claims are a part of this invention.

What is claimed is:

1. An improved method of dehydrating alcohol, which method comprises contacting alcohol selected from the group consisting of paraffinic alcohol, cycloparaffinic alcohol and mixtures thereof in a reaction zone with a catalyzing concentration of a mixture of a major proportion of selected polyglycol ether and a minor proportion of selected mineral acid at a dehydration reaction temperature above the boiling point of the dehydration product of said alcohol but below the boiling point of said alcohol, maintaining said contact for a time sufficient to substantially dehydrate said alcohol to the corresponding unsaturated hydrocarbon product, and recovering said product.

2. An improved method of dehydrating alcohol, which method comprises contacting alcohol selected from the group consisting of paraffinic alcohol, cycloparaffinic alcohol and mixtures thereof in a reaction zone with a catalyzing concentration of a mixture of a major proportion of selected polyglycol ether and a minor proportion of selected mineral acid at a dehydration reaction temperature above the boiling point of the dehydration product of said alcohol but below that temperature at which a substantial proportion of the reactants are vaporized, maintaining said contact for a time sufficient to substantially completely convert said alcohol to the corresponding unsaturated hydrocarbon product, and recovering said hydrocarbon product as gaseous effluent.

3. An improved method of dehydrating alcohol, which method comprises continuously contacting alcohol selected from the group consisting of paraffinic alcohol, cycloparaffinic alcohol and mixtures thereof in a reaction zone with a catalyzing concentration of a mixture of a major proportion of selected polyglycol ether and a minor proportion of selected mineral acid at an alcohol dehydration reaction temperature above the boiling point of the dehydration product of said alcohol but below a temperature at which a substantial proportion of the reactants are vaporized, continuously dehydrating said alcohol and recovering corresponding unsaturated hydrocarbon product as gaseous effluent, and continuously introducing into said reaction zone make-up quantities of said alcohol, which alcohol has been preheated to about the reaction temperature.

4. An improved method of dehydrating alcohol which method comprises contacting alcohol selected from the group consisting of secondary paraffinic alcohol, tertiary paraffinic alcohol, secondary cycloparaffinic alcohol, tertiary cycloparaffinic alcohol and mixtures thereof in a reaction zone with a catalyzing concentration of a mixture of a major proportion of selected polyglycol ether and a minor proportion of selected mineral acid at a reaction temperature above the boiling point of the dehydration product of said alcohol but below that temperature at which a substantial proportion of the reactants are vaporized, maintaining said contact for a time sufficient to substantially dehydrate said alcohol to the corresponding unsaturated hydrocarbon product, and recovering said product as gaseous effluent.

5. An improved method of dehydrating alcohol which method comprises contacting alcohol selected from the group consisting of secondary paraffinic alcohol, tertiary paraffinic alcohol, secondary cycloparaffinic alcohol, tertiary cycloparaffinic alcohol and mixtures thereof in a reaction zone with a catalyzing concentration of a mixture of a major proportion of selected polyglycol ether and a minor proportion of sulfuric acid at a reaction temperature above the boiling point of the dehydration product of said alcohol but below that temperature at which a substantial proportion of the reactants are vaporized, maintaining said contact for a time sufficient to substantially completely dehydrate said alcohol to the corresponding unsaturated hydrocarbon product, recovering said product as gaseous effluent, and condensing the same.

6. An improved method of dehydrating alcohol, which method comprises contacting alcohol selected from a group consisting of paraffinic alcohol, secondary paraffinic alcohol, tertiary paraffinic alcohol, secondary cycloparaffinic alcohol, tertiary cycloparaffinic alcohol and mixtures thereof in a reaction zone with a catalyzing concentration of a mixture of a major proportion of tetraethylene glycol and a minor proportion of sulfuric acid at a reaction temperature above the boiling point of the dehydration product of said alcohol but below that temperature at which a substantial proportion of the reactants vaporize, maintaining said contact for a time sufficient to substantially completely dehydrate said alcohol to the corresponding unsaturated hydrocarbon product, and recovering said product as gaseous effluent.

7. An improved method of dehydrating alcohol which method comprises contacting alcohol selected from a group consisting of secondary paraffinic alcohol, tertiary paraffinic alcohol, secondary cycloparaffinic alcohol, tertiary cycloparaffinic alcohol and mixtures thereof in a reaction zone with a catalyzing concentration of a mixture of tetraethylene glycol and between about one and about ten weight percent, based on the tetraethylene glycol, of sulfuric acid at a reaction temperature above the boiling point of the dehydration product of said alcohol but below that temperature at which a substantial proportion of the reactants vaporize, maintaining said contact for a time sufficient to substantially completely dehydrate said alcohol to the corresponding unsaturated hydrocarbon product, and recovering said product as gaseous effluent.

8. An improved method of dehydrating cyclohexanol which method comprises contacting cyclohexanol in a reaction zone with a catalyzing concentration of a mixture of tetraethylene glycol and between about one and ten weight percent, based on the weight of said tetraethylene glycol, of sulfuric acid at a reaction temperature above the boiling point of cyclohexene but below that temperature at which a substantial proportion of said cyclohexanol is polymerized and below the temperature at which a substantial proportion of the cyclohexanol is vaporized, maintaining said contact for a time sufficient to substantially completely dehydrate said cyclohexanol to cyclohexene, and recovering the cyclohexene as gaseous effluent.

9. An improved method of dehydrating cyclohexanol which method comprises contacting cyclohexanol in a reaction zone with a catalyzing concentration of a mixture of tetraethylene glycol and about five weight percent, based on the tetraethylene glycol, of sulfuric acid at a reaction temperature above the boiling point of cyclohexene but below that temperature at which a substantial proportion of the cyclohexanol is polymerized and below a temperature at which a substantial proportion of the cyclohexanol is vaporized, maintaining said contact for a time sufficient to substantially completely dehydrate the cyclohexanol to cyclohexene, and recovering the cyclohexene as gaseous effluent.

10. The method of claim 9 wherein cyclohexanol is continuously introduced into said reaction zone as make-up during said dehydration, said make-up cyclohexanol having been preheated to about the reaction temperature before said introduction, and wherein cyclohexene is continuously recovered as overhead product and condensed.

11. An improved catalyst for dehydrating cyclohexanol to cyclohexene, said catalyst consisting essentially of a mixture of tetraethylene glycol and sulfuric acid, said sulfuric acid being present in a concentration of about five weight percent, based on said tetraethylene glycol.

References Cited by the Examiner

UNITED STATES PATENTS

| 2,671,121 | 3/1954 | Banes et al. | 260—682 |
| 2,957,034 | 10/1960 | Eschard | 260—666 |
| 2,967,153 | 1/1961 | Houston | 252—194 |

OTHER REFERENCES

Synthetic Organic Chemicals, tenth edition, Oct. 15, 1940, (pp. 13, 15, 16), Carbide and Carbon Chemicals Corp. 30 E. 42nd St., New York, N.Y.

DELBERT E. GANTZ, *Primary Examiner.*

DANIEL E. WYMAN, *Examiner.*

P. P. GARVIN, V. O'KEEFE, *Assistant Examiners.*